United States Patent
Lee et al.

(10) Patent No.: US 7,988,115 B2
(45) Date of Patent: Aug. 2, 2011

(54) PIVOTING SUPPORT HOOK ASSEMBLY

(75) Inventors: Joel R. Lee, Peotone, IL (US); Donald F. Ruffatto, Jr., New Lenox, IL (US)

(73) Assignee: Illinois Tool Works Inc., Glenview, IL (US)

( * ) Notice: Subject to any disclaimer, the term of this patent is extended or adjusted under 35 U.S.C. 154(b) by 89 days.

(21) Appl. No.: 12/686,828

(22) Filed: Jan. 13, 2010

(65) Prior Publication Data

US 2010/0187393 A1   Jul. 29, 2010

Related U.S. Application Data

(60) Provisional application No. 61/147,503, filed on Jan. 27, 2009.

(51) Int. Cl.
*F16B 45/00* (2006.01)
*B60R 7/00* (2006.01)

(52) U.S. Cl. ......... 248/304; 248/294.1; 16/438; 16/444; 16/445; 224/313; 296/214

(58) Field of Classification Search .................. 248/304, 248/690, 691, 692, 308, 290.1, 294.1, 914; 296/214, 97.9; 16/438, 445, 444; 224/313, 224/268

See application file for complete search history.

(56) References Cited

U.S. PATENT DOCUMENTS

| | | | | |
|---|---|---|---|---|
| 6,076,233 A | * | 6/2000 | Sasaki et al. | 16/444 |
| 6,397,435 B1 | * | 6/2002 | Gosselet | 16/438 |
| 6,692,067 B2 | * | 2/2004 | Inari et al. | 296/214 |
| 6,968,601 B2 | * | 11/2005 | Bivens et al. | 24/369 |

* cited by examiner

*Primary Examiner* — Anita M King
(74) *Attorney, Agent, or Firm* — Mark W. Croll; Paul F. Donovan

(57) ABSTRACT

An articulating hook assembly adapted to pivot between open and closed positions as desired. The assembly includes a support frame, a hook pivot base of cloven construction projecting outwardly away from the support frame and a support hook adapted to pivotally engage the hook pivot base. The hook pivot base includes a pair of ear members separated by a variable width gap. At least one ear member includes a contoured inner face with a pattern of variable height surface structures including at least a first depression and a second depression with a raised height platform disposed between the first depression and a second depression. A projection finger on the support hook rides in sandwiched relation within the variable width gap such that upon rotation of the support hook between open and closed positions, the finger projection moves across the raised height platform surface between the first depression and a second depression.

20 Claims, 4 Drawing Sheets

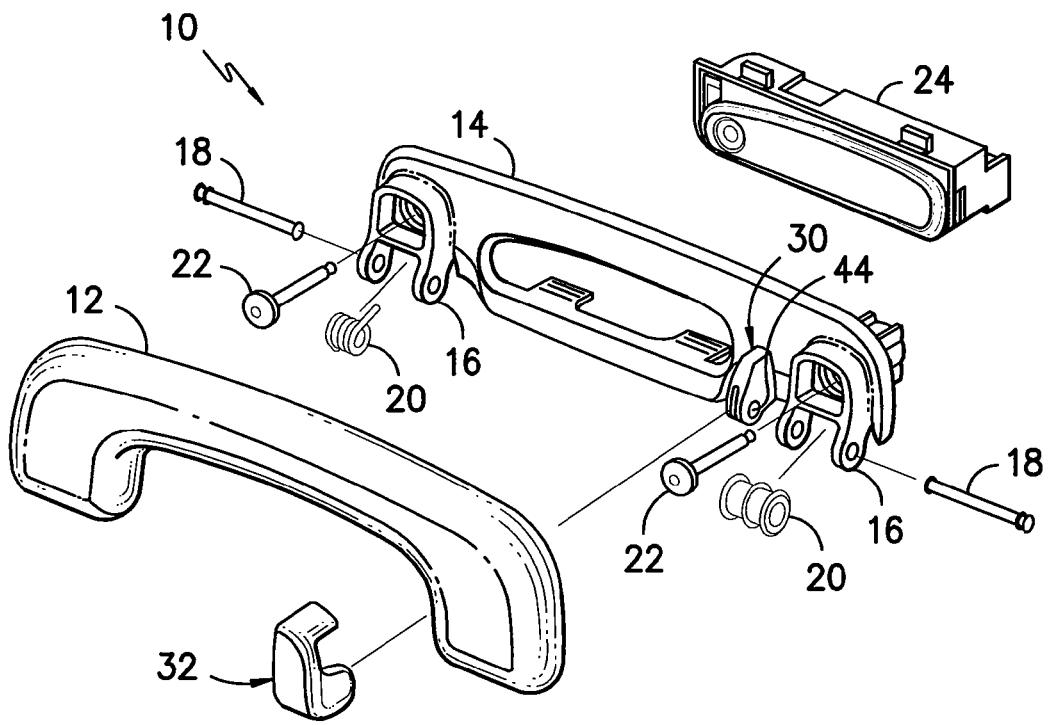
FIG. -1-
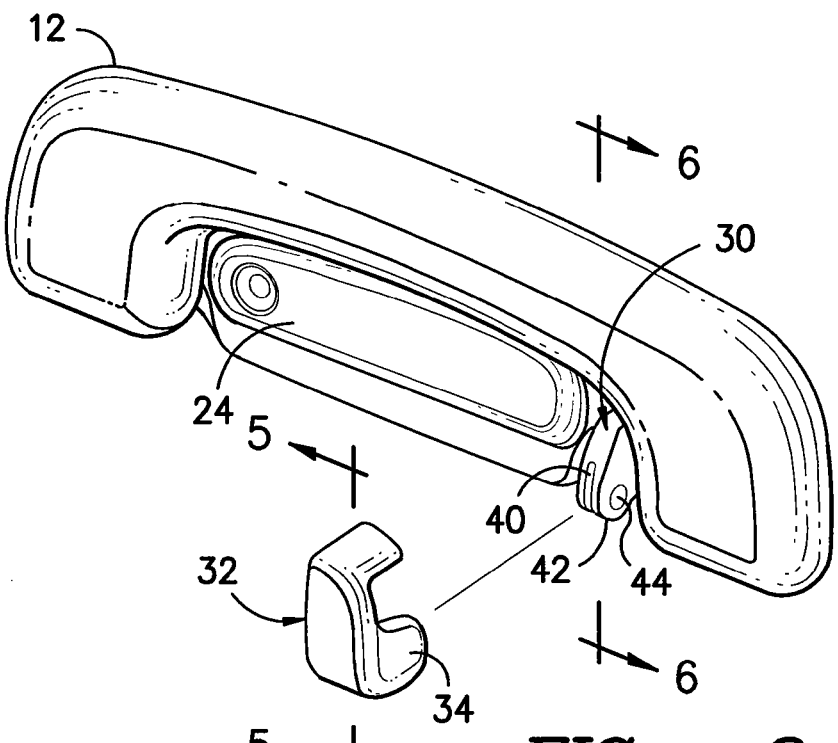
FIG. -2-

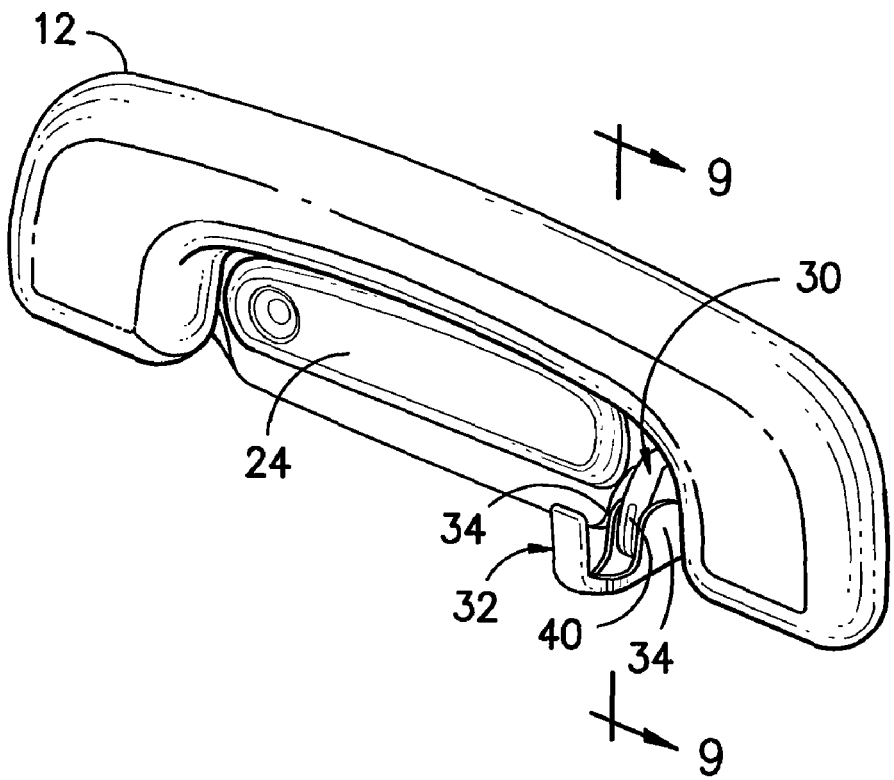
FIG. -3-
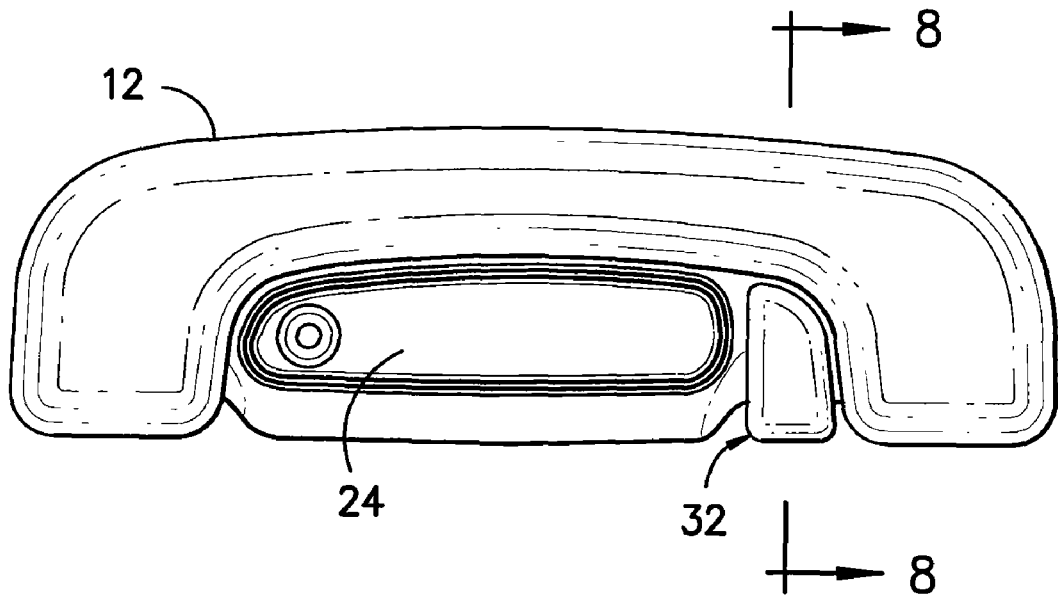
FIG. -4-

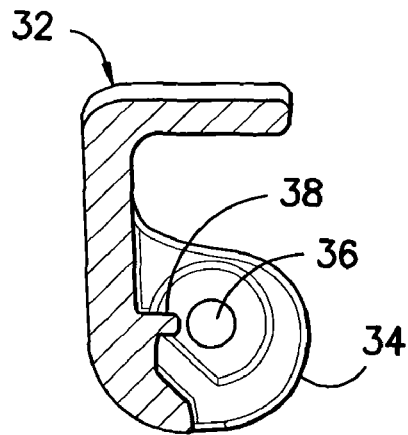
FIG. -5-
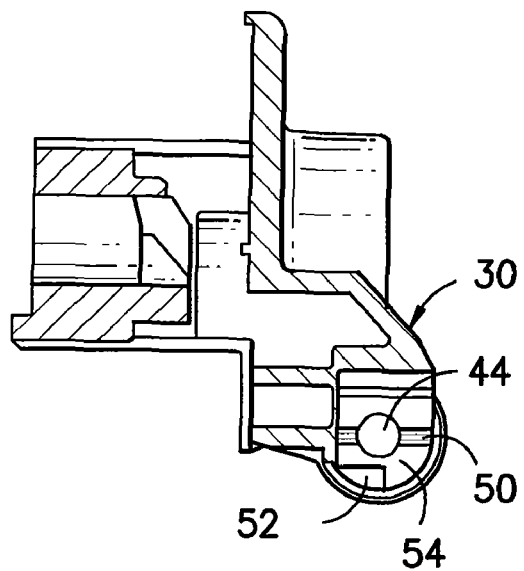
FIG. -6-
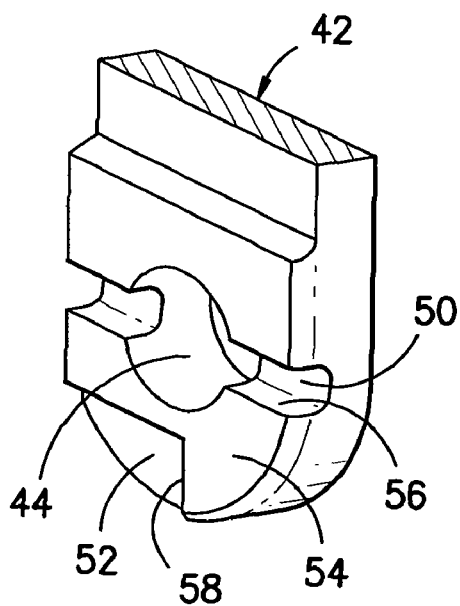
FIG. -7-

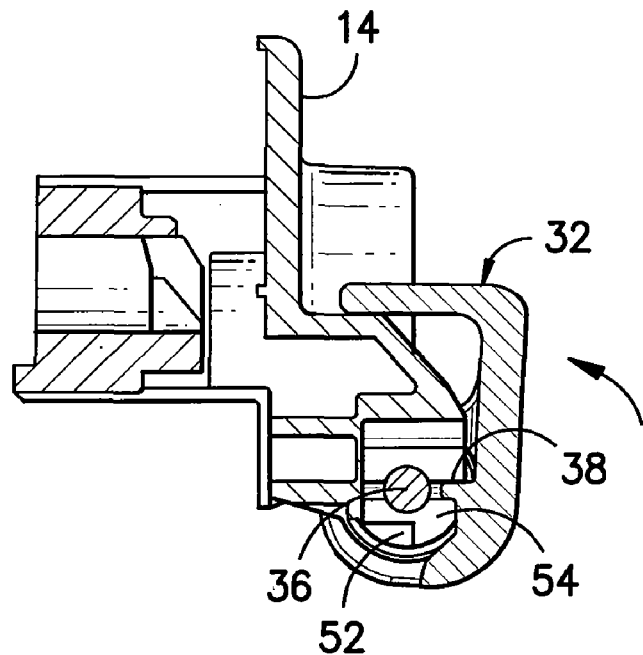
FIG. -8-
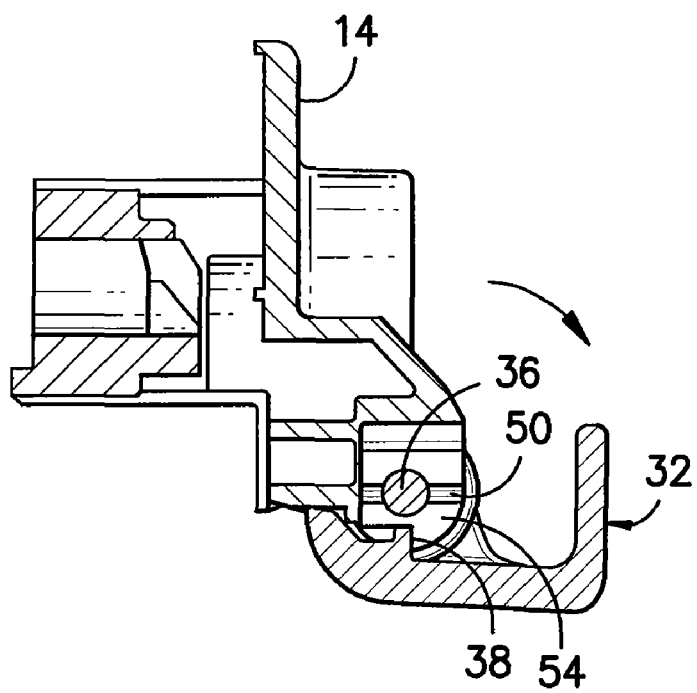
FIG. -9-

# PIVOTING SUPPORT HOOK ASSEMBLY

CROSS-REFERENCE TO RELATED APPLICATION

This application claims the benefit of U.S. Provisional Application Ser. No. 61/147,503, filed Jan. 27, 2009, the contents of which are hereby incorporated by reference as if fully set forth herein.

TECHNICAL FIELD

The present invention relates generally to an articulating support hook and is more particularly directed to a pivoting coat hook adapted for inclusion within a grab handle assembly incorporating an articulating handle for use in a transportation vehicle or the like. The hook may be pivoted from a closed position to an open position either independently or in conjunction with an associated handle. The hook assembly of the present invention does not rely on pivot pins or springs as are used in prior designs. The system of the present invention provides reduced complexity with the elimination of components while retaining the functionality of prior hook configurations.

BACKGROUND OF THE INVENTION

In many environments of use the presence of an articulating grab handle may be beneficial. By way of example only, and not limitation, such articulating grab handles may be used at positions in raised adjacent relation to an occupant seat in a transportation vehicle such as an automobile, aircraft, watercraft, railroad car, or the like. Such a handle can be grasped by a user to provide stability as he or she moves between seated and unseated conditions. Such handle assemblies may also incorporate lights to allow the user to read or to perform other functions when natural light is limited.

In some environments, it may be desirable for a user to have access to an outwardly projecting support hook to hang clothing, coats and other articles in an accessible yet out of the way position. It may also be desirable that the outwardly projecting support hook be movable between open and closed positions so as to project outwardly in an operative condition only when in use.

In the past, articulating coat hooks have been incorporated into grab handle structures. However, such prior hooks typically have incorporated a pivot pin in conjunction with spring biasing to permit operative rotation of the hook between open and closed positions. While such prior systems have been functional, they utilize multiple parts which must be assembled in a relatively complex operation. Accordingly, it would be beneficial to provide a functional hook structure of reduced complexity.

SUMMARY OF THE INVENTION

The present invention provides advantages and alternatives over the prior art by providing an articulating hook assembly adapted to pivot between open and closed positions as desired. The hook assembly is stable in both the open and the closed positions and is not reliant upon internal springs for operation. The hook assembly is adapted for incorporation into the base of an articulating handle structure if desired.

According to one aspect, a pivoting support hook assembly is provided including a support frame, a hook pivot base of cloven construction projecting outwardly away from the support frame and a support hook adapted to pivotally engage the hook pivot base in straddling relation to the hook pivot base. The hook pivot base includes a first ear member and a second ear member. The first ear member and the second ear member are on opposing sides of a variable width gap. At least one of the ear members includes a contoured inner face with a pattern of variable height surface structures including at least a first depression and a second depression with a raised height platform disposed between the first depression and the second depression. The support hook includes a first raised side wall and a second raised side wall disposed in opposing relation to one another on opposite lateral sides of the support hook. The support hook further includes a finger projection extending between the first raised side wall and the second raised side wall. The finger projection is adapted for acceptance in sliding relation within the variable width gap between the ear members when the first raised side wall and the second raised side wall are disposed in straddling relation to the hook pivot base. Upon rotation of the support hook between open and closed positions, the finger projection moves across the raised height platform surface between the first depression and a second depression.

According to another aspect, a pivoting support hook assembly is provided including a support frame, a hook pivot base of cloven construction projecting outwardly away from the support frame and a support hook adapted to pivotally engage the hook pivot base in straddling relation to the hook pivot base. The hook pivot base includes a first ear member and a second ear member. The ear members are on opposing sides of a variable width gap. The first ear member and the second ear member each include an outer surface having an acceptance opening disposed along an axis transverse to the gap. At least one of the first ear member and the second ear member has a contoured inner face with a pattern of variable height surface structures including at least a first depression and a second depression with a raised height platform disposed between the first depression and a second depression. The first depression is an elongated groove and the boundary between the second depression and the raised height platform is a ledge oriented transverse to the elongated groove. The support hook includes a first raised side wall and a second raised side wall disposed in opposing relation to one another on opposite lateral sides of the support hook. A first detent projects away from an inner surface of the first raised side wall and a second detent projects away from an inner surface of the second raised side wall. A finger projection extends between the first raised side wall and the second raised side wall in transverse orientation to an axis defined by the first detent and the second detent. The first detent is adapted for acceptance in rotatable relation within the acceptance opening of the first ear member. The second detent is adapted for acceptance in rotatable relation within the acceptance opening of the second ear member. The finger projection is adapted for acceptance in sliding relation between the first ear member and the second ear member when the first detent and the second detent are held within the acceptance openings of the ear members. Upon rotation of the support hook between an open and closed position, the finger projection moves across the raised height platform surface between the first depression and a second depression.

According to still another aspect, a pivoting support hook assembly is provided including a support frame, a hook pivot base of cloven construction projecting outwardly away from the support frame and a support hook adapted to pivotally engage the hook pivot base in straddling relation to the hook pivot base. The hook pivot base includes a first ear member and a second ear member, the first ear member and the second ear member are on opposing sides of a variable width gap. The first ear member and the second ear member each include an outer surface having an acceptance opening disposed along an axis transverse to the gap. The first ear member and the second ear member each have a contoured inner face with a pattern of variable height surface structures including a first depression and a second depression with a raised height platform surface disposed between the first depression and a second depression. The inner faces of the first ear member and the second ear member are substantially aligned mirror images of one another. The support hook includes a first raised side wall and a second raised side wall disposed in opposing relation to one another on opposite lateral sides of the support hook. A first detent projects away from an inner surface of the first raised side wall and a second detent projecting away from an inner surface of the second raised side wall. A finger projection extends between the first raised side wall and the second raised side wall in transverse orientation to an axis defined by the first detent and the second detent. The first detent is adapted for acceptance in rotatable relation within the acceptance opening of the first ear member. The second detent is adapted for acceptance in rotatable relation within the acceptance opening of the second ear member. The finger projection is adapted for acceptance in sliding relation between the first ear member and the second ear member when the first detent and the second detent are held within the acceptance openings of the ear members. Upon rotation of the support hook between an open and closed position, the finger projection will move across the raised height platform surfaces between the first and second depressions.

BRIEF DESCRIPTION OF THE DRAWINGS

FIG. 1 is an exploded assembly view of an exemplary grab handle structure incorporating an exemplary hook assembly in accordance with the present invention;

FIG. 2 is a partially assembled view of the handle structure in FIG. 1 illustrating the connective relation of a hook to a hook pivot base mounted at the handle assembly;

FIG. 3 is a fully assembled view similar to FIG. 2 showing the hook in attached snap-in relation to the hook pivot attachment base with the hook in an open condition;

FIG. 4 is a view similar to FIG. 3 showing the hook in the closed condition.

FIG. 5 is a view taken generally through the hook along line 5-5 in FIG. 2;

FIG. 6 is a cut-away view illustrating an interior of the hook pivot base taken generally along line 6-6 in FIG. 2;

FIG. 7 is an enhanced magnification view of an inner surface of a ear element within the hook pivot base illustrated in FIG. 6;

FIG. 8 is a cross-sectional view taken generally through line 8-8 in FIG. 4 showing the hook in a closed position; and FIG. 9 is a cross-sectional view similar to FIG. 8 taken generally along line 9-9 in FIG. 3 showing the hook in a closed position.

Before the embodiments of the invention are explained in detail, it is to be understood that the invention is not limited in its application to the details of construction and the arrangement of the components set forth in the following description or illustrated in the drawings. Rather, the invention is capable of other embodiments and of being practiced or being carried out in various ways. Also, it is to be understood that the phraseology and terminology used herein are for the purposes of description only and should not be regarded as limiting. The use herein of "including," "comprising" and variations thereof is meant to encompass the items listed and equivalents thereof, as well as additional items and equivalents thereof.

DETAILED DESCRIPTION OF THE PREFERRED EMBODIMENTS

Reference will now be made to the drawings, wherein to the extent possible, like elements are designated by like reference numerals throughout the various views. FIG. 1 is an exploded assembly view of an exemplary grab handle assembly 10 such as may be used in a transportation vehicle (not shown) adjacent to an occupant seat. The exemplary grab handle assembly 10 includes a pivoting handle portion 12 that is mounted in pivoting relation to a support frame 14 at brackets 16. The handle portion 12 and the support frame may be formed from any suitable material including plastic, metal or the like.

One or more biasing members 20 such as springs or the like may be disposed in operative connection between the handle portion 12 and the support frame 14 to continuously urge the handle portion to the upward stowed condition illustrated in FIG. 2. In operation, the handle portion 12 can move downwardly away from the orientation illustrated in FIG. 2 by rotation about pivot pins 18 extending through the brackets 16. Mounting pins 22 or other structures may be used to secure the support frame 14 and the attached handle portion 12 to a support surface such as a vehicle pillar or support panel mounted behind the vehicle headliner (not shown). In the illustrated grab handle assembly 10 an optional light fixture 24 is mounted to project through an aperture within the support frame 14. Of course, such a light fixture may likewise be eliminated if desired, in which case the support frame 14 may be free of any aperture.

In accordance with a preferred embodiment of the present invention, the support frame 14 includes an integral hook pivot base 30 of cloven construction adapted to accept and retain a pivoting hook 32. The pivoting hook 32 and the pivot base cooperatively define a support hook assembly. As may be seen through joint reference to FIGS. 3 and 4, the hook 32 may be rotated between an open, outwardly projecting operative orientation shown in FIG. 3 and a closed, stowed condition illustrated in FIG. 4 while maintaining the attached relation with the hook pivot base 30.

As best illustrated through joint reference to FIGS. 3 and 5, the hook 32 has a generally cradle-like concave structure. Spaced-apart opposing sidewalls 34 of generally semi-circular or lobed geometry extend upwardly from opposing lateral sides of the hook 32 at the proximal end of the hook. As best seen in FIG. 5, the interior surface of each of the sidewalls 34 includes an inwardly projecting detent 36. In this regard, it will be understood that while only a single sidewall is illustrated in the cut-away view of FIG. 5, in the preferred practice the opposing sidewall likewise includes an inwardly projecting detent such that the detents 36 projecting inwardly from the opposing sidewalls are disposed generally along a common axis extending transverse to the length dimension of the hook.

As illustrated in FIG. 5, the hook 32 also includes a finger projection 38 which extends away from the base of the hook 32 generally between the sidewalls 34. Thus, the finger projection 38 extends in substantially parallel orientation to the planes defined by the sidewalls 34. As will be described more fully hereinafter, the finger projection 38 operates in conjunction with the hook pivot base 30 base to hold the hook 32 securely in a desired open or closed position.

As illustrated in FIGS. 1, 2, and 3, the hook pivot base 30 has a generally cloven configuration with a gap 40 separating a pair of opposing outwardly projecting ear elements 42 of generally plate-like configuration. As shown, the ear elements 42 include acceptance openings 44 that are adapted to receive the detents 36 projecting inwardly from the sidewalls 34 of the hook 32 when the hook 32 is snapped into space about the hook pivot base 30. In this regard, the spacing between the detents 36 projecting inwardly from the sidewalls 34 preferably is slightly less than the width of the hook pivot base 30. Thus, when the sidewalls 34 of the hook are pushed into place over the hook pivot base 30, the ear elements 42 of the hook pivot base 30 will flex inwardly to a slight degree and will then rebound as the detents 36 enter the acceptance openings 44. This provides a snap-in locked relation between the hook 32 and the hook pivot base 30. In this attached relation, the hook 32 may rotate about the axis defined by the detents 36 residing within the acceptance openings 44.

Referring to FIGS. 5 through 9, the positional locking character of the hook 32 will now be described. Referring specifically to FIGS. 6 and 7, it will be seen that the inner face of the ear elements 42 includes an arrangement of ledges and depressions disposed radially from the acceptance opening 44. In this regard, it will be appreciated that while the inner surface of only a single ear element 42 is shown, a mirror image contoured pattern of depressions and ledges preferably is disposed across the inner surface of the opposing ear element in the hook pivot base 30. However, patterning across a single inner surface may likewise be used if desired.

As best seen in FIG. 7, the inner surface of each ear element 42 includes a groove 50 running in substantially transverse bisecting relation to the acceptance opening 44. The inner face of the ear elements 42 also includes a depression zone 52. The depression zone 52 is disposed radially outward from the acceptance opening 44 and is circumferentially removed from the groove 50. A raised platform surface 54 is positioned circumferentially between the groove 50 and the depression zone 52. The platform surface 54 has a height in excess of the groove 50 and the depression zone 52.

As best seen in FIG. 7, in the exemplary arrangement, the platform surface 54 is bounded by a first ledge 56 and by a second ledge 58. The first ledge 56 defines the boundary between the groove 50 and the platform surface 54. The second ledge 58 defines the boundary between the depression zone 52 and the platform surface 54. As shown, the second ledge 58 is oriented in transverse relation to the first ledge 56. In this regard, the second ledge 58 may be oriented substantially orthogonal to the first ledge 56, although other orientations may likewise be used.

As noted previously and illustrated in FIG. 5, the hook 32 includes a finger projection 38 which extends away from the base between the sidewalls 34. When the sidewalls 34 are press-fit about the hook pivot base 30 the finger projection 38 fits into the gap 40 in sandwiched relation between the ear elements 42. This arrangement is best illustrated in FIGS. 8 and 9. As shown, when the hook 32 is rotated to the open outwardly projecting orientation (FIG. 9) for acceptance of a coat or other hanging object, the finger projection 38 is disposed in sandwiched relation between the opposing depression zones 52 of the opposing ear elements 42. When the hook 32 is rotated upwardly to the closed stowed position illustrated in FIG. 8, the finger projection 38 is housed within groove 50 in sandwiched relation between the opposing ear elements 42.

As will be recognized, in both the open and closed conditions the hook 32 is blocked from experiencing inadvertent displacement due to the presence of the raised platform surface 54. Specifically, in the event that the hook 32 is in the open position of FIG. 9, a sufficient and deliberate closing force must be applied to cause the finger projection 38 to ride over the second ledge 58 and across the platform surface 54 before dropping into the groove 50. Likewise, in order for the hook 32 to move from the closed position to the opening position an adequate force must be applied to cause the finger projection 38 to ride over the first ledge 56 and across the platform surface 54 until dropping into the depression zone 52. In this regard, it will be understood that the platform surfaces 54 on the interior of the ear elements 42 cooperatively define a constriction in the width of the gap 40. Thus, as the finger projection 38 passes over the platform surfaces 54 an enhanced resistance is encountered which provides a controlled feel to the rotation. Once the final desired position is reached, the hook 32 then resides within the groove 50 or the depression zone 52 and remains stable until an adequate force is applied to change the condition. Thus, inadvertent hook displacement substantially avoided.

Of course, variations and modifications of the foregoing are within the scope of the present invention. Thus, it is to be understood that the invention disclosed and defined herein extends to all alternative combinations of two or more of the individual features mentioned or evident from the text and/or drawings. All of these different combinations constitute various alternative aspects of the present invention. The embodiments described herein explain the best modes known for practicing the invention and will enable others skilled in the art to utilize the invention. the claims are to be construed to include alternative embodiments and equivalents to the extent permitted by the prior art.

Various features of the invention are set forth in the following claims.

What is claimed is:

1. A pivoting support hook assembly comprising:
a support frame;
a hook pivot base of cloven construction projecting outwardly away from the support frame, the hook pivot base including a first ear member and a second ear member, the first ear member and the second ear member being on opposing sides of a variable width gap, at least one of the first ear member and the second ear member having a contoured inner face with a pattern of variable height surface structures including at least a first depression and a second depression with a raised height platform disposed between the first depression and a second depression;
a support hook adapted to pivotally engage the hook pivot base in straddling relation to the hook pivot base, the support hook including a first raised side wall and a second raised side wall disposed in opposing relation to one another on opposite lateral sides of the support hook, the support hook further including a finger projection extending between the first raised side wall and the second raised side wall, the finger projection being adapted for acceptance in sandwiched sliding relation between the first ear member and the second ear member when the first raised side wall and the second raised side wall are disposed in straddling relation to the hook pivot base, such that upon rotation of the support hook between open and closed positions, the finger projection moves across the raised height platform surface between the first depression and the second depression.

2. A pivoting support hook assembly as recited in claim 1, wherein the first ear member and the second ear member have a substantially plate-like structure.

3. A pivoting support hook assembly as recited in claim 1, wherein the support hook is substantially cradle shaped.

4. A pivoting support hook assembly as recited in claim 3, wherein the first raised side wall and the second raised side wall are located at a proximal end of the support hook.

5. A pivoting support hook assembly as recited in claim 4, wherein the first raised side wall and the second raised side wall have a substantially lobed geometry.

6. A pivoting support hook assembly comprising:
a support frame;
a hook pivot base of cloven construction projecting outwardly away from the support frame, the hook pivot base including a first ear member and a second ear member, the first ear member and the second ear member being on opposing sides of a variable width gap, the first ear member and the second ear member each including an outer surface having an acceptance opening disposed along an axis transverse to the gap, at least one of the first ear member and the second ear member having a contoured inner face with a pattern of variable height surface structures including at least a first depression and a second depression with a raised height platform disposed between the first depression and a second depression, wherein the first depression comprises an elongated groove, and wherein the boundary between the second depression and the raised height platform comprises a ledge oriented transverse to the elongated groove;
a support hook adapted to pivotally engage the hook pivot base in straddling relation to the hook pivot base, the support hook including a first raised side wall and a second raised side wall disposed in opposing relation to one another on opposite lateral sides of the support hook, a first detent projecting away from an inner surface of the first raised side wall and a second detent projecting away from an inner surface of the second raised side wall, a finger projection extending between the first raised side wall and the second raised side wall in transverse orientation to an axis defined by the first detent and the second detent, the first detent adapted for acceptance in rotatable relation within the acceptance opening of the first ear member, the second detent adapted for acceptance in rotatable relation within the acceptance opening of the second ear member and the finger projection adapted for acceptance in sandwiched sliding relation between the first ear member and the second ear member when the first detent and the second detent are held within the acceptance openings of the ear members, such that upon rotation of the support hook between an open and closed position, the finger projection will move across the raised height platform surface between the first depression and the second depression.

7. A pivoting support hook assembly as recited in claim 6, wherein the first ear member and the second ear member have a substantially plate-like structure.

8. A pivoting support hook assembly as recited in claim 6, wherein the support hook is substantially cradle-shaped.

9. A pivoting support hook assembly as recited in claim 8, wherein the first raised side wall and the second raised side wall are located at a proximal end of the support hook.

10. A pivoting support hook assembly as recited in claim 9, wherein the first raised side wall and the second raised side wall have a substantially lobed geometry.

11. A pivoting support hook assembly as recited in claim 9, wherein the first detent and the second detent project along a common axis.

12. A pivoting support hook assembly comprising:
a support frame;
a hook pivot base of cloven construction projecting outwardly away from the support frame, the hook pivot base including a first ear member and a second ear member, the first ear member and the second ear member being on opposing sides of a variable width gap, the first ear member and the second ear member each including an outer surface having an acceptance opening disposed along an axis transverse to the gap, the first ear member and the second ear member each having a contoured inner face with a pattern of variable height surface structures including a first depression and a second depression with a raised height platform surface disposed between the first depression and a second depression, wherein the inner faces of the first ear member and the second ear member are substantially aligned mirror images of one another;
a support hook adapted to pivotally engage the hook pivot base in straddling relation to the hook pivot base, the support hook including a first raised side wall and a second raised side wall disposed in opposing relation to one another on opposite lateral sides of the support hook, a first detent projecting away from an inner surface of the first raised side wall and a second detent projecting away from an inner surface of the second raised side wall, a finger projection extending between the first raised side wall and the second raised side wall in transverse orientation to an axis defined by the first detent and the second detent, the first detent adapted for acceptance in rotatable relation within the acceptance opening of the first ear member, the second detent adapted for acceptance in rotatable relation within the acceptance opening of the second ear member and the finger projection adapted for acceptance in sandwiched sliding relation between the first ear member and the second ear member when the first detent and the second detent are held within the acceptance openings of the ear members, such that upon rotation of the support hook between an open and closed position, the finger projection will move across the raised height platform surfaces between the first and second depressions.

13. A pivoting support hook assembly as recited in claim 12, wherein the first ear member and the second ear member have a substantially plate-like structure.

14. A pivoting support hook assembly as recited in claim 12, wherein the support hook is substantially cradle-shaped.

15. A pivoting support hook assembly as recited in claim 14, wherein the first raised side wall and the second raised side wall are located at a proximal end of the support hook.

16. A pivoting support hook assembly as recited in claim 15, wherein the first raised side wall and the second raised side wall have a substantially lobed geometry.

17. A pivoting support hook assembly as recited in claim 15, wherein the first detent and the second detent project along a common axis.

18. A pivoting support hook assembly as recited in claim 15, wherein first depression comprises an elongated groove oriented transverse to the acceptance openings of the first ear member and the second ear member.

19. A pivoting support hook assembly as recited in claim 18, wherein the boundary between the second depression and the raised height platform comprises a ledge oriented transverse to the elongated groove.

20. A pivoting support hook assembly as recited in claim 19, wherein the ledge is oriented substantially perpendicular to the elongated groove.

* * * * *